United States Patent [19]

Thatcher

[11] Patent Number: 4,982,635
[45] Date of Patent: Jan. 8, 1991

[54] VERTICAL DEFLASHING MACHINE

[76] Inventor: Alan J. Thatcher, 9182 E. Russell St., La Habra, Calif. 90631

[21] Appl. No.: 205,863

[22] Filed: Jun. 13, 1988

[51] Int. Cl.⁵ .............................................. B26D 5/04
[52] U.S. Cl. ........................................ 83/149; 83/167; 83/214; 83/262; 83/282; 83/380; 83/914
[58] Field of Search .................. 83/167, 214, 262, 282, 83/444, 380, 914, 618, 149

[56] References Cited

U.S. PATENT DOCUMENTS

| | | | |
|---|---|---|---|
| 3,228,086 | 1/1966 | Brown et al. | 83/914 |
| 3,377,899 | 4/1968 | Wolford | 83/914 |
| 3,464,084 | 9/1969 | Thompson | 83/914 |
| 3,540,371 | 7/1969 | Rudolph | 83/914 |
| 3,771,394 | 11/1973 | Harris et al. | 83/914 |
| 3,791,245 | 2/1974 | Eggert | 83/914 |
| 3,795,162 | 3/1974 | Jaeger | 83/914 |
| 4,404,836 | 9/1983 | Saunders | 83/914 |

Primary Examiner—Douglas D. Watts
Assistant Examiner—Scott A. Smith
Attorney, Agent, or Firm—Edgar W. Averill, Jr.

[57] ABSTRACT

A vertical deflashing machine for removing the flashing from blow molded, plastic objects such as containers. The machine has one or more object supporting cavities which support an object to be deflashed in a vertical position. While the object is being supported, a cutting plate moves through the object supporting cavities and strikes and cuts off the flashing affixed to the object. The object remains in a vertical position.

10 Claims, 4 Drawing Sheets

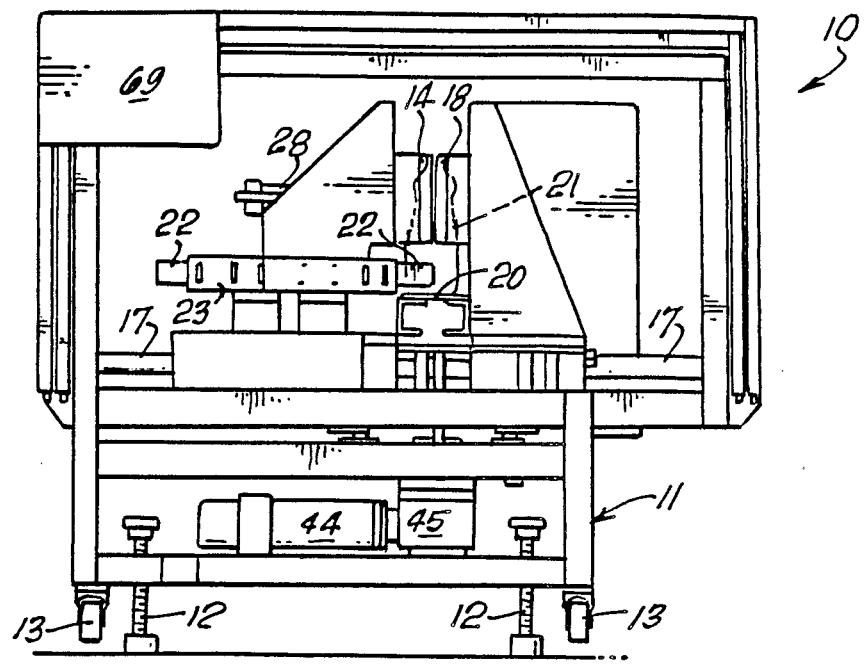
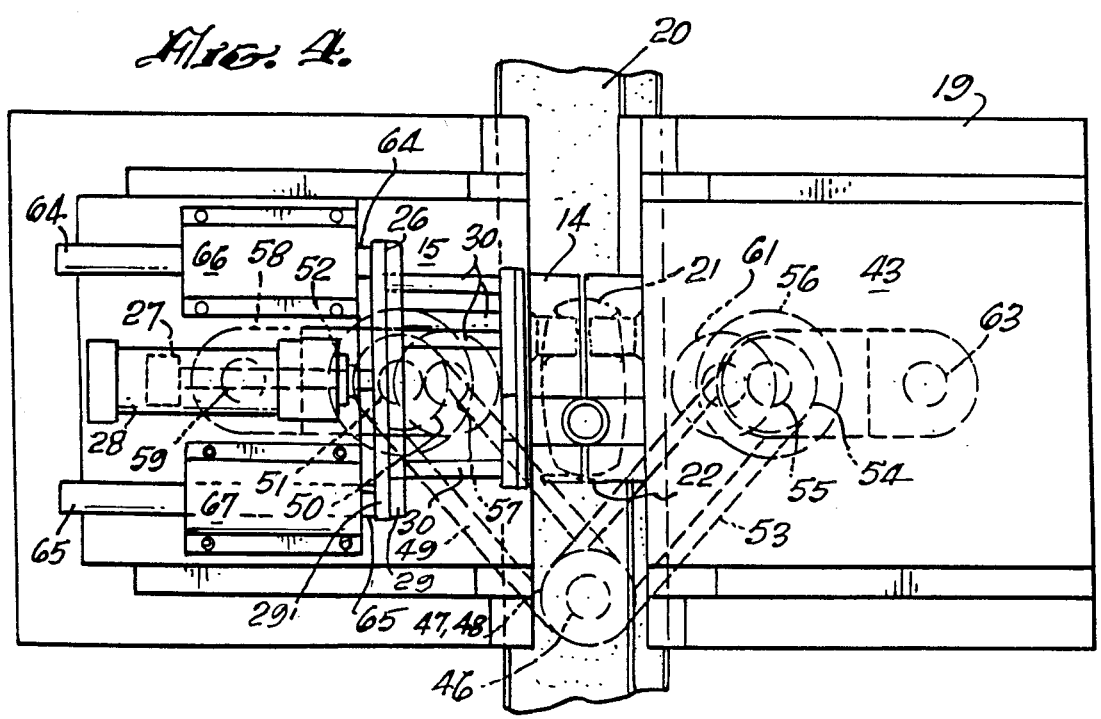

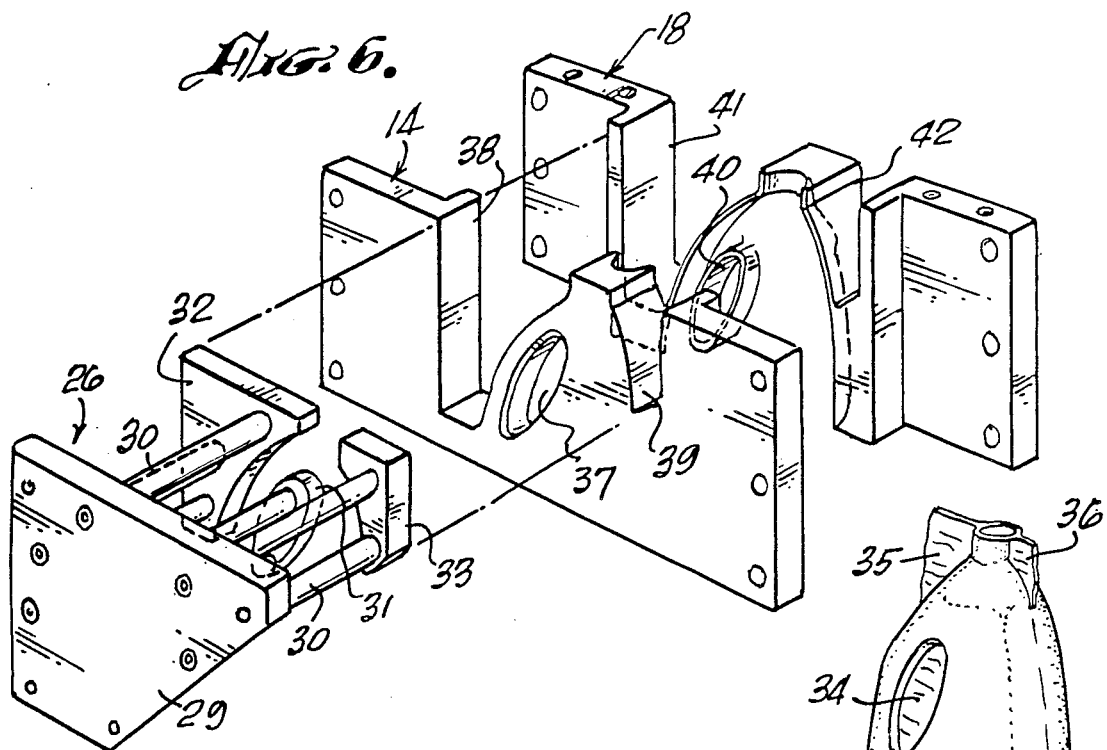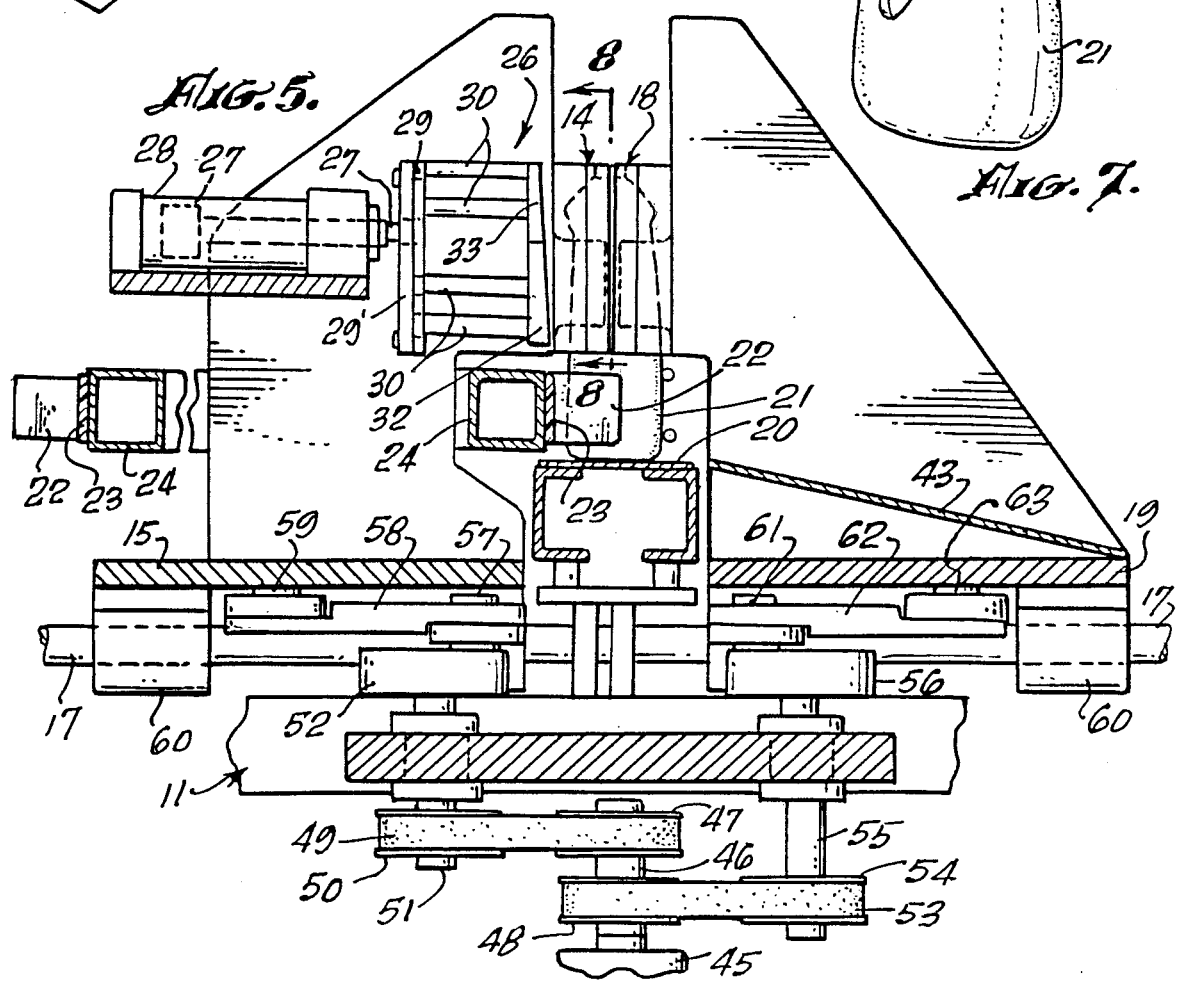

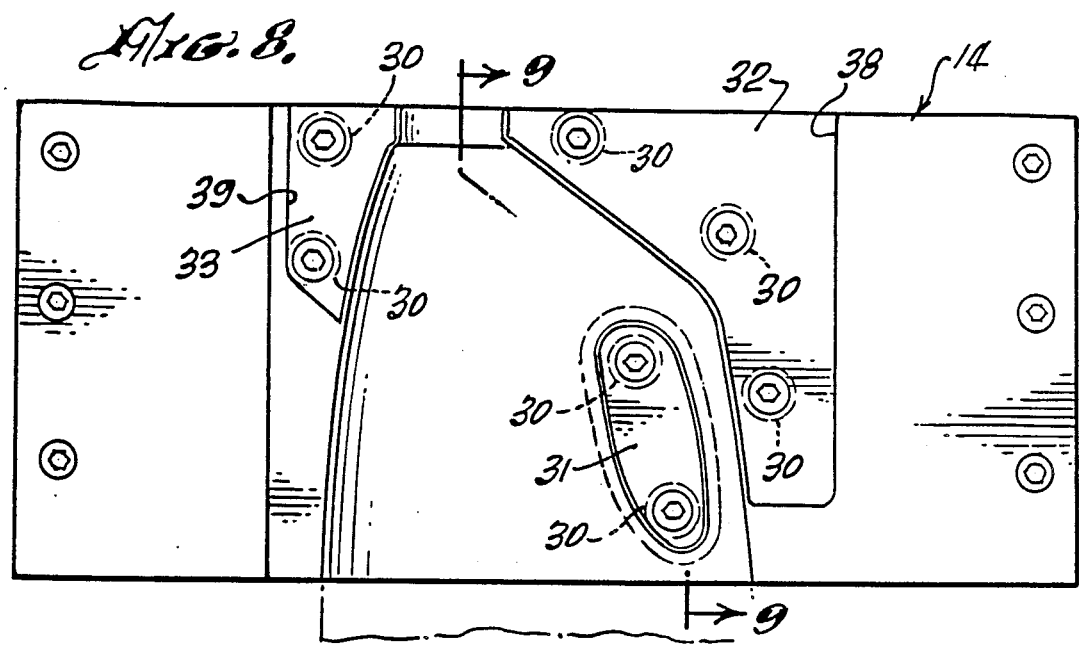
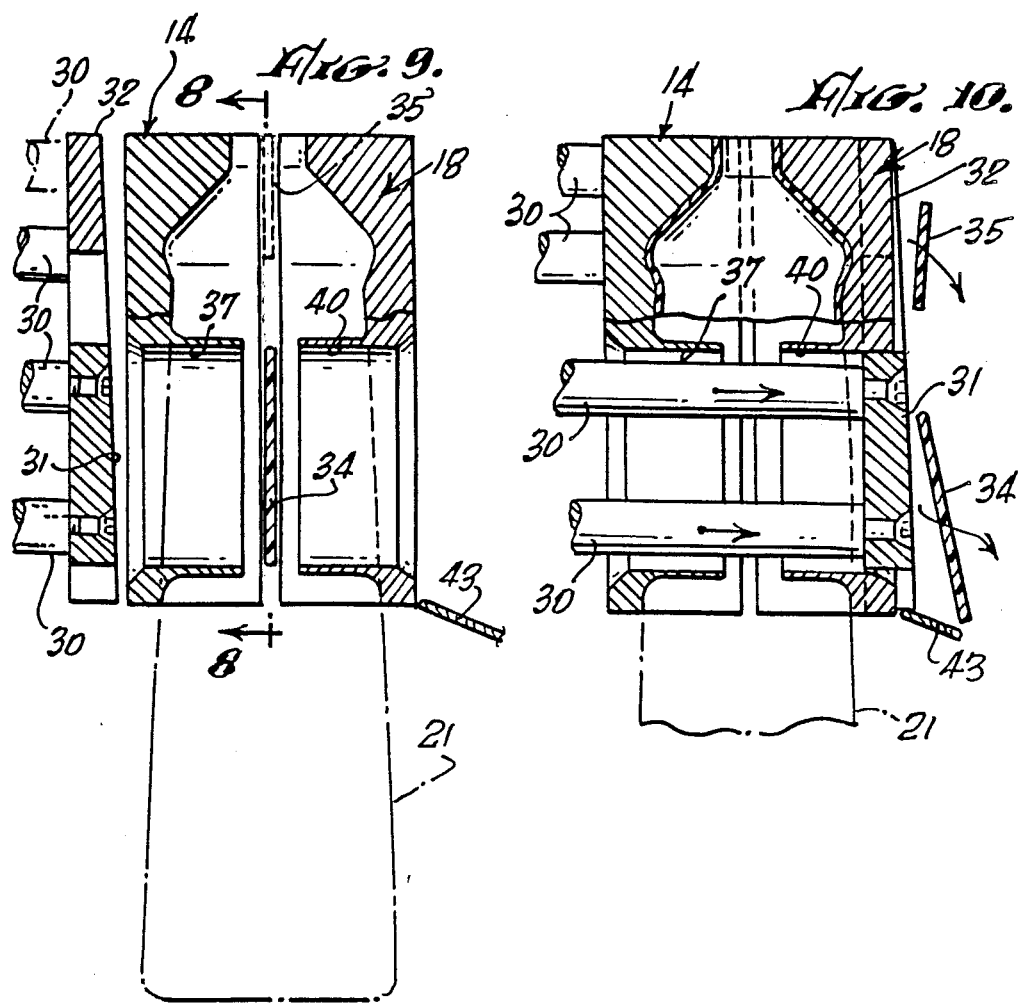

VERTICAL DEFLASHING MACHINE

BACKGROUND OF THE DISCLOSURE

The field of the invention is blow molding machinery and the invention relates more particularly to machinery for automatically removing the flashing from blow molded, plastic objects.

During the blow molding process, flashing is often molded along a portion of the parting line of the molded object. The flashing is held to the part by a thin web and is designed to be knocked from the object after the object has been removed from the mold. Although this can be carried out by hand, it is preferably done automatically. The most commonly used machine for this purpose involves a machine utilizing buckets which support an object in a horizontal position in a cavity, and a cutting tool is driven through openings in the bucket thereby driving the flashing away from the object. Such machines are typically noisy and relatively slow in operation. Typically, such machines operate at a rate of twenty to thirty objects per minute and in order to keep up with a blow molding operation which molds sixty objects per minute, two or three cavities must be formed in each bucket. Also, the object, once deflashed, must be repositioned in a vertical manner so that further operations, such as leak detecting, flaming, labeling and cameras for checking can be carried out.

SUMMARY OF THE INVENTION

It is an object of the present invention to provide a deflashing machine which is capable of deflashing a blow molded object in a vertical position.

It is another object of the present invention to provide a deflashing machine capable of operating at rates up to sixty objects per minute.

The present invention is for a vertical deflashing machine for removing the flashing from blow molded, plastic objects such as containers. The machine has a frame with a generally horizontal conveying surface held thereon. A first deflashing nest is supported by the frame and positioned on the first side of the conveying surface. The first deflashing nest can be moved toward the conveying surface to support an object on the surface and away from the conveying surface after a deflashing step. A horizontally movable deflashing tooling cutting plate is supported by the frame on the first side of the conveying surface, and the cutting plate may be moved toward the object to be deflashed and away after the deflashing step. A second deflashing nest is also supported by the frame and is positioned on the second side of the conveying surface. This deflashing nest can also be moved inwardly and outwardly to support an object on the conveying surface. Timing means are provided for moving the first and second deflashing nests inwardly at the same time to grasp an object on the conveying surface. Once grasped, the tooling cutting plate is moved inwardly in a timed manner to cut off flashing from the supported object. The cutting tool is then moved outwardly, and the first and second deflashing nests are moved outwardly in preparation for the next object on the surface.

BRIEF DESCRIPTION OF THE DRAWINGS

FIG. 3 is an end view thereof.

FIG. 4 is an enlarged plan view showing the carriage assemblies of the deflashing machine of claim 1.

FIG. 5 is an enlarged end view showing the drive means and the carriages of the vertical deflashing machine of FIG. 1.

FIG. 6 is an exploded, perspective view of a deflashing tooling cutting plate and first and second deflashing nests.

FIG. 7 is a perspective view of a container including flashing prior to being deflashed by the vertical deflashing machine of the present invention.

FIG. 8 is an enlarged cross-sectional view taken along line 8—8 of FIG. 5.

FIG. 9 is a cross-sectional view taken along line 9—9 of FIG. 8.

FIG. 10 is a view analogous to FIG. 9 but showing the deflashing tooling cutting plate after it has passed through the object to be deflashed.

DESCRIPTION OF THE PREFERRED EMBODIMENTS

Figure 1:
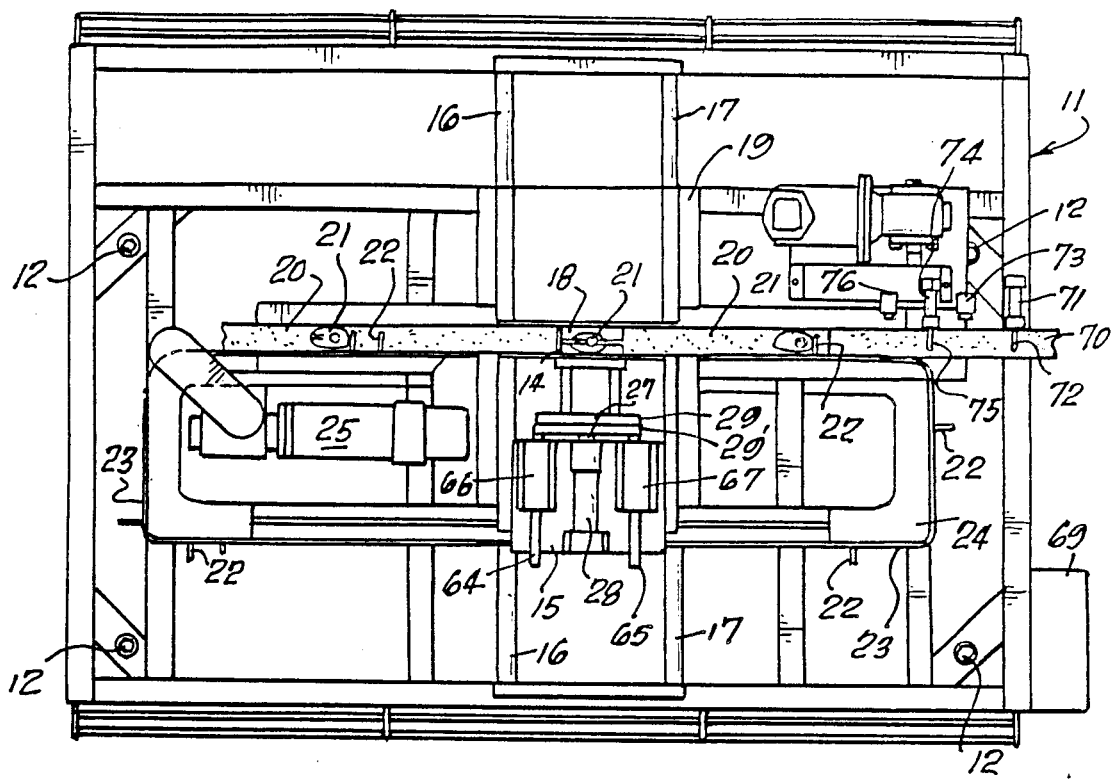
FIG. 1 is a plan view of the vertical deflashing machine of the present invention.
Figure 2:
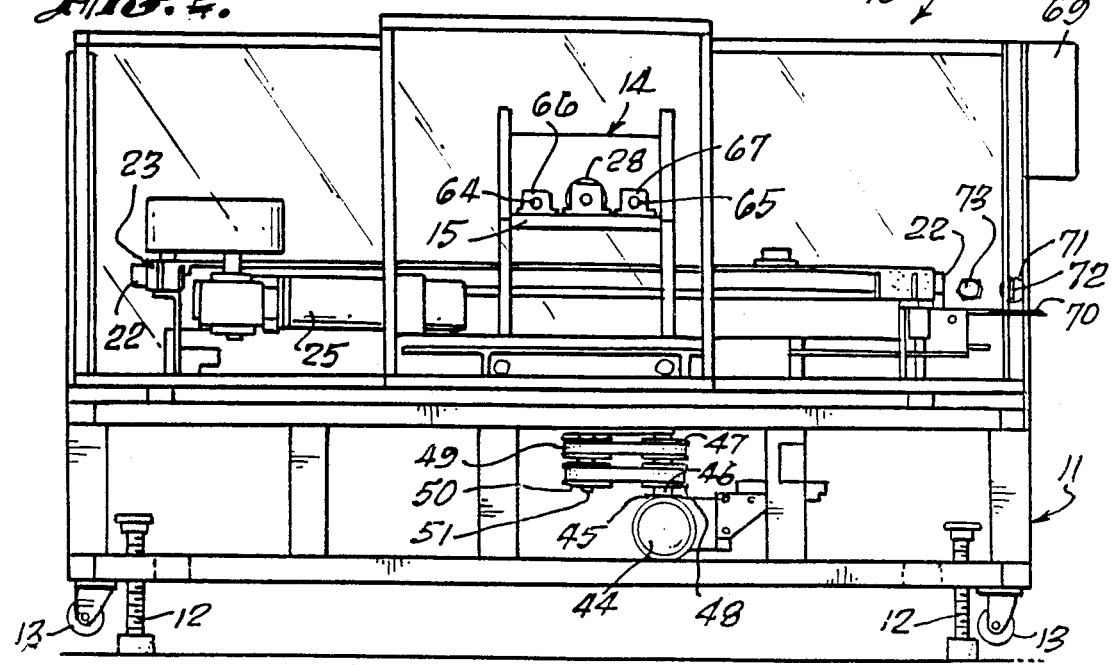
FIG. 2 is a side view thereof.

The vertical deflashing machine of the present invention is shown in plan view in FIG. 1 and indicated generally by reference character 10. The deflashing machine 10 has a frame 11 which is adjustably held on the floor by four adjustable legs 12 (shown best in FIG. 2). The frame is also supportable by four caster wheels 13 to enable it to be easily moved when adjustable legs 12 have been moved upwardly to permit wheels 13 to contact the floor. Once moved to the proper position, the adjustable legs 12 are screwed downwardly to raise the frame to a height where the conveying surface of the deflashing machine is at the same level as the conveyors which feed and accept product from the deflashing machine.

The major elements of the vertical deflashing machine comprise a first deflashing nest 14 which is supported on a first carriage 15 which, in turn, is supported by a pair of rails 16 and 17 which comprise cylindrical rods attached to the frame. A second deflashing nest 18 is supported on a second carriage 19 which, likewise, is supported on cylindrical rails 16 and 17. The deflashings nests 14 and 18 preferably do not touch one another at their inwardmost position. The result is a very quiet operation which greatly reduces noise in the processing area. A conveying surface 20 is horizontal and has a small upper surface so that objects placed thereon will be easily moved by paddles to a position directly between the first and second deflashing nests 14 and 18. The movement of the objects 21 are guided along the conveying surface 12 by paddles 22 affixed to a vertical conveyor belt 23 supported on a vertical conveyor belt frame 24. This vertical conveyor is accurately driven by a closed loop DC servo drive 25 which moves the paddles 22 in a predetermined manner to accurately position the objects 21 between the first and second deflashing nests 14 and 18 for deflashing. The paddles contact the objects 21 near the bottom thereof and the deflashing nests move above the paddles 22.

The deflashing is carried out by the reciprocation of deflashing tooling cutting plate 26 which is supported on a plate 29, held by piston 27 which is driven by an air cylinder 28. The deflashing tooling cutting plate 26 is supported on a pair of cylindrical rods 64 and 65 held by bearings held in pillow blocks 66 and 67.

The piston and air cylinder are also supported on first carriage 15 so that they move forwardly when first carriage 15 moves forwardly, thus reducing the distance which the cutting plate must travel. The cutting plate is shown in FIG. 6 as are the details of the first and second deflashing nests. There it can be seen that deflashing tooling cutting plate 26 has a support plate 29 which holds a series of rods 30 which hold a handle flashing cutting tool 31, a top flashing cutting tool 32 and a top flashing cutting tool 33. Support plate 29 is bolted to a plate 29, affixed to piston 27. As shown in FIG. 7, the object to be cut is a container 21 which has handle flashing 34, top flashing 35 above handle flashing 34, and top flashing 36 on the opposite side of container 21. It can also be seen in FIG. 6 that the first deflashing nest 14 has a handle opening 37, a top flashing opening 38 and a top flashing opening 39. Similarly, second deflashing nest 18 has a handle opening 40 and top flashing openings 41 and 42. The position of the first and second deflashing nests, when in a closed position, is shown in FIG. 5 prior to the outer movement of the cutting tools 31, 32 and 33. This is shown in an enlarged cross-sectional view in FIG. 9. After the air cylinder 28 has been fed with a supply of air, piston 27 moves outwardly and carries with it the deflashing tooling cutting plate 26 and its associated tooling to the position shown in FIG. 10 where the removed flashing portions 34 and 35 are shown as they fall from the inner side of the flashing nest 18. A conveyor chute 43 is affixed to second carriage 19 and moves inwardly and outwardly therewith. Thus, the cut flashing is conveyed away from the object and the conveying surface and does not interfere with the movement of the deflashed objects along conveying surface 20.

It is, of course, important that the first and second deflashing nests move in an accurately controlled manner toward an object to be deflashed. This is carried out by a second closed loop DC servo drive 44 which is held by the frame and affixed to a gear box 45 which includes gear means which drive a shaft 46 which, in turn, drives a first carriage drive pulley 47 and a second carriage drive pulley 48. A first carriage drive belt 49 drives a pulley 50 which is, in turn, affixed to a shaft 51 which turns a crank 52 as more fully described below. Similarly, pulley 48 moves a drive belt 53 which, in turn, turns a pulley 54 affixed to a shaft 55 which turns a second crank 56.

Closed loop DC servo drive 44 may be accurately controlled so that the first and second carriages accelerate rapidly, then decelerate as they approach their inwardmost position. This provides a very smooth and yet rapid movement of the first and second deflashing nests. The construction of the cranks is shown best in FIGS. 5 and 3. In FIG. 5, in can be seen that crank 52 has an offset arm 57 which is rotatingly affixed to a link 58 which, in turn, is rotatingly affixed to a driven arm 59 securely held on carriage 15. Carriage 15 is supported by four bearings held in pillow blocks, such as pillow block 60 shown in FIG. 5. Similarly, crank 56 has an offset arm 61 which is rotatingly affixed to a link 62 which, in turn, is rotatingly affixed to a driven arm 63 which is securely affixed to carriage 18. Bearings held in pillow blocks 60 provide a low friction manner of allowing second carriages 15 and 19 to move inwardly and outwardly as driven by cranks 52 and 56. It can also be appreciated that the movement of carriage 15 and carriage 19 is synchronized and that they are both driven from the same shaft 46. Cranks 52 and 56 may move through a 360° cycle for each deflashing cycle, but preferably move back and forth through an arc of less than 180°.

In the preferred embodiment, the starting and ending points are set by computer software and hardware. In this way, the deflasher may readily be adjusted on the fly to accommodate a change in the part to be deflashed. A starting degree of rotation could be 30°, and an ending degree could be 150°. Then, to adjust for a smaller part, the starting degree could be changed to 60° and the ending to 130°. The DC servo motor and software accurately control the speed and amount of turn so that a smooth deflashing step is possible. This also leads to a faster cycle for smaller parts which is appropriate in that smaller parts are typically molded faster by the blow molding machine. It is, of course, possible to change the size of cranks 52 and 56 as well as the location of offset arms 57 and 61 to permit greater or less travel of carriages 15 and 19.

The support of cylinder 28 on carriage 15 is shown clearly in FIG. 5 where it is clear that it moves inwardly with carriage 15 to decrease the travel necessary for deflashing tooling cutting plate 26.

A control box 69 is indicated schematically in the drawings and contains appropriate computer programmable chips which control the movement of closed loop DC servo drives 25 and 44, as well as the other electrical and air sources to the vertical deflasher 10.

A feed conveyor 70 brings bottles to be deflashed toward the conveying surface 20. The first bottle in line is stopped by a stop arm 72 extended from first air cylinder 71. To begin a cycle, stop arm 72 is retracted and a bottle, or other object, 21 is released and is carried by conveyor 70. It is then stopped by stop arm 75 on second air cylinder 74. A photoelectric eye 73 senses the presence of a bottle against arm 75, and arm 72 will not be released until there is no bottle against arm 75. After arm 75 is retracted, it is conveyed along conveyor 70 until it is sensed by photoelectric cell 76. This starts vertical conveyor 23 whose paddles 22 move the bottle from the end of conveyor belt 70 to conveyor surface 20. The paddles then move the bottle to the deflashing station between deflashing nests 14 and 18.

While the deflashing tooling cutting plate 26 is shown as supported on a carriage, it is, of course, possible that this could be separate from the carriage and otherwise supported on the frame. While a single nest deflashing tool is shown, it is, of course, within the purview of the present invention that a multiple cavity nest could also be used. While the deflashing tooling cutting plate is shown as driven by an air cylinder, this could be hydraulically, electrically or otherwise driven. Similarly, while a belt drive (preferably a toothed belt drive) is shown in the drawings to turn the cranks 52 and 56, other drive means can be used. The unit is preferably enclosed by transparent polycarbonate windows which also further reduce the noise of operation and increase the safety by being linked with the drive operation of the machine causing the machine to shut down if any of the doors are open.

The vertical deflasher of the present invention is capable of trimming resins including, but not limited to PETG, barrier resins, K resins, polyethylene and polypropylene. The machine may be easily added to lines for detabbing, labeling, flaming and other operations. Because the DC servo motors may be controlled over a wide range of speeds and movements, the machine is highly adjustable for a wide variety of deflashing functions.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A vertical deflashing machine for removing the flashing from blow molded, plastic objects such as containers, said machine comprising:
   a frame having a generally horizontal conveying surface held thereon, said conveying surface having a first side and a second side;
   an object to be deflashed, said object being carried on said conveying surface, and said object having a first side and a second side;
   a first deflashing nest supported by said frame and positioned on the first side of said conveying surface;
   a second deflashing nest supported by said frame and positioned on the second side of said conveying surface;
   a horizontally, movable, deflashing tooling cutting plate supported by said frame on the first side of said conveyor belt;
   means for moving said first and second deflashing nest inwardly at the same time toward said object to be deflashed, said means comprising first and second pulleys on a driven shaft, said first pulley having belt means thereon which drives a first driven pulley and said second pulley having belt means thereon which drives a second driven pulley, and said first and second pulleys are interconnected with said first and second deflashing nest to cause them to move inwardly and outwardly; and
   means for moving said tooling cutting plate toward said object to be deflashed, said means for moving said tooling cutting plate being independently actuated from said means for moving said first and second deflashing nests.

2. The vertical deflashing machine of claim 1 wherein said first and second driven pulleys are connected to first and second crank members, and said first and second crank members are affixed to first and second crank arms which, in turn, are affixed to said first and second deflashing nests.

3. The vertical deflashing machine of claim 2 wherein said first and second crank members are moved through an arc of less than 180°.

4. The vertical deflashing machine of claim 1 wherein said first and second pulleys are turned by a closed loop DC servo drive motor.

5. A vertical deflashing machine for removing the flashing from blow molded, plastic objects such as containers, said machine comprising:
   a frame having a generally horizontal conveying surface held thereon, said conveying surface having a first side and a second side;
   a first carriage held by rail means supported by said frame and positioned on the first side of said conveying surface, said first carriage supporting a deflashing nest first half, said deflashing nest half having a nest with a vertical face for supporting a first side of a vertical object;
   a horizontally movable deflashing tooling cutting plate supported by said first carriage, said tooling cutting plate being horizontally movable from a withdrawn position away from said conveying surface and an extended position toward said conveying surface;
   a second carriage held by rail means supported by said frame and positioned on the second side of said conveying surface, said second carriage supporting a deflashing nest second half, said deflashing nest second half having a nest with a vertical face for supporting a second side of a vertical object;
   a drive shaft termed by a DC servo motor, said drive shaft holding first and second pulleys, said first pulley having belt means thereon which drives a first driven pulley, and said second pulley has belt means thereon which drives a second driven pulley, and said first and second driven pulleys are interconnected with said first and second carriages, respectively, so that when said driven shaft is turned in a first direction, said first and second carriages move inwardly together, and when said driven shaft is turned in an opposite direction, said first and second carriages move outwardly; and
   means for horizontally moving said tooling cutting plate toward said conveying surface and away from said conveying surface, said means for moving said tooling cutting plate being independently driven from said driven shaft.

6. The vertical deflashing machine of claim 5 wherein the objects to be deflashed are moved along said conveying surface by a vertical conveyor having a plurality of object moving paddles.

7. The vertical deflashing machine of claim 6 wherein said vertical conveyor encircles said first carriage.

8. The vertical deflashing machine of claim 5 further including a discharge chute affixed to said second carriage for conveying flashing away from the object.

9. The vertical deflashing machine of claim 5 wherein said rail means comprise two horizontal, cylindrical rods held by said frame.

10. The vertical deflashing machine of claim 5 further including means for adjusting the height of the machine whereby the joining of the machine to other blow molded object forming and treating devices is facilitated.

* * * * *